US 6,646,984 B1
(12) United States Patent
Mehra et al.

(10) Patent No.: US 6,646,984 B1
(45) Date of Patent: Nov. 11, 2003

(54) NETWORK TOPOLOGY WITH ASYMMETRIC FABRICS

(75) Inventors: Pankaj Mehra, San Jose, CA (US); Robert W. Horst, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/268,918

(22) Filed: Mar. 15, 1999

(51) Int. Cl.[7] .................. H04L 12/50; H04Q 11/04
(52) U.S. Cl. ................ 370/220; 370/235; 370/351; 370/387; 340/2.2
(58) Field of Search ................... 370/352, 353, 370/354, 357, 360, 386, 387, 388, 389, 391, 392, 400, 217, 218, 220, 225, 230, 231, 235, 238, 351; 340/2.2, 2.21, 2.25, 2.6, 14.1, 14.2, 2.27, 2.28; 379/271, 273

(56) References Cited

U.S. PATENT DOCUMENTS

| | | | | |
|---|---|---|---|---|
| 5,345,229 A | * | 9/1994 | Olnowich et al. | 709/243 |
| 5,436,886 A | * | 7/1995 | McGill | 370/16 |
| 5,493,565 A | * | 2/1996 | Hanson et al. | 370/55 |
| 5,526,359 A | * | 6/1996 | Read et al. | 370/100.1 |
| 5,542,048 A | * | 7/1996 | Olnowich et al. | 709/243 |
| 5,751,932 A |   | 5/1998 | Horst et al. | 395/182.1 |
| 5,790,519 A | * | 8/1998 | Hanson et al. | 370/220 |
| 5,798,580 A | * | 8/1998 | Morozov et al. | 307/112 |
| 5,875,314 A | * | 2/1999 | Edholm | 710/317 |
| 5,982,746 A | * | 11/1999 | Hanson et al. | 370/220 |
| 6,185,222 B1 | * | 2/2001 | Hughes | 370/414 |
| 6,233,236 B1 | * | 5/2001 | Nelson et al. | 370/359 |
| 6,473,827 B2 | * | 10/2002 | McMillen et al. | 710/316 |

OTHER PUBLICATIONS

Alan Heirich, David Garcia, Michael Knowles & Robert Horst—Compaq Computer Corporation, Tandem Divison, "ServerNet–II: a Reliable Interconnect for Scalable High Performance Cluster Computing", Sep. 21, 1998.

Yitzhak Birk, Fouad A. Tobagi, Michel E. Marhic, "Bus–Oriented Interconnection Topologies For Single–Hop Communication Among Multi–Transceiver Stations", ©1988 IEEE.

* cited by examiner

Primary Examiner—Alpus H. Hsu

(57) ABSTRACT

Enhanced performance is realized in a multi-fabric/multi switch group interconnect network by providing asymmetric fabric topologies wherein at least one link between a user-port and a switch-port (or between a pair of switch ports) is different in the fabrics. Asymmetry in fabric topology can increase lower-distance (distance-1) pairs, increase network bisection capacity, or reduce the number of switches employed. End nodes can choose at the time of connection the fabric which offers a shorter connection or fewer router hops. Alternatively, a connection can be set up to use either fabric with the end node dynamically exercising its preference for the fabric that offers the shorter path at the time of data transfer. While the number of router hops does not significantly alter message latency in wormhole-routed networks, it does lower link occupancy and thereby average link contention.

39 Claims, 5 Drawing Sheets

THE 72-NODE 48-SWITCH SERVERNET-1 TOPOLOGY DEPLOYED AT SANDIA NATIONAL LABS

NETWORK TOPOLOGY WITH ASYMMETRIC FABRICS

BACKGROUND OF THE INVENTION

This invention relates generally to digital networks for interconnecting multiple users, and more particularly the invention relates to a multi-fabric topology for interconnecting nuilti-port user nodes.

Fault tolerant computer systems typically run in a multi-processor environment in which computers can operate in parallel with one or more levels of redundancy. Such a system is described in U.S. Pat. No. 5,751,932 for "Fail-Fast, Fail-Functional, Fault-Tolerant Multiprocessor System", assigned to Tandem Computers Incorporated, now Compaq Computer Corporation. Central Processing Units (CPUs) in this system operate in pairs with each user node having an X CPU with an X port and a Y CPU with a Y port. The X ports of all X processors are interconnected by an X fabric comprising a first topology of multi-port switches, and the Y ports of all Y processors are interconnected by a Y fabric comprising a second topology of multi-port switches. The patent describes the use of "TNet" Links comprising two uni-directional 10-bit sub-link busses connecting the X port and the Y port to the multi-port switches.

Tandem has introduced also a ServerNet-II cluster computing system consisting of network interface cards (NICs), 12-port crossbar routers (switches), and interconnecting links.

The switches and a switch topology for cluster computing are described in "ServerNet-II: a reliable interconnect for scalable high performance cluster computing", Heirich, Garcia, Knowles, and Horst, Compaq Computer Corporation, Tandem Division, Sep. 21, 1998. As there described, the Server Net System Area Network (SAN) is a scalable interconnect technology designed as the primary interconnect for high availability information processing systems. These systems are characterized by round the clock availability in high profile locations where they support online transaction processing, telecommunications, internet service providers, and other applications. The ServerNet-II (SAN) achieves its high level availability by incorporating fault tolerant mechanisms at every architectural level. Failures in routing nodes that could impact the interconnect fabric are detected and isolated through self-checking logic. Failures in network links or routing elements are retried or re-routed along an alternate path through the fabric.

Heretofore, the multiple fabrics (X, Y) interconnecting multiple processors have generally had the same topologies with an equal number of switches interconnected together and with users in identical networks. The performance of each fabric or interconnect network can be defined in terms of inter-node distances, number of switch components, and data transfer capacity or bisection bandwidth. The bisection width is equal to the number of links in the weakest fabric bisection. While number of router hops does not significantly alter message latency in wormhole-routed networks, it does lower link occupancy and average link contention. The present invention is directed to enhancing network performance by employing asymmetric fabric topologies in a multi-fabric environment.

SUMMARY OF THE INVENTION

The invention is directed to a method of structuring a switch network having at least two groups of multi-port switches and the resulting network for interconnecting multi-port user nodes to enhance network performance such as increased bisection bandwidth, reduced inter-node distances, or reduced number of switches.

A first switch group is provided having a first plurality of multi-port switches interconnected with a first plurality of user ports whereby the first plurality of user ports are interconnected through one or more of the first plurality of switches. A second switch group is then provided which has a second plurality of multi-port switches interconnected with a second plurality of user ports whereby the second plurality of user ports are interconnected through one or more of the second plurality of switches. The first switch group and the second switch group are asymmetrical with at least one path between two nodes being of different length in the two groups of switches. By careful introduction of asymmetry between the switch groups, network performance is enhanced.

In the environment with two port (X,Y) user nodes, two switch groups are provided with the X ports of all user nodes being connected to the X switch group and the Y ports of all user nodes being connected to the Y switch group, each switch group comprising a plurality of multi-port crossbar switches. All of the plurality of X ports are interconnected through the X switch group and all the plurality of Y ports are interconnected through the Y switch groups. In structuring the asymmetry between switch groups, at least one distance -n (i.e., n-hop), a path between nodes) in the X switch group is not a distance -n in the Y switch group. Alternatively, or in addition thereto, the X switch group can have a different number of switches than has the Y switch group. In the embodiments where the switch groups are not interconnected, each switch group constitutes an independent fabric.

The invention and objects and features thereof will be more readily apparent from the following detailed description and appended claims when taken with the drawing.

BRIEF DESCRIPTION OF THE DRAWINGS

FIGS. 3A–3C illustrate a switch network for a 72-node 48-switch topology using 6-port switches in two (X,Y) asymmetric fabrics in accordance with another embodiment of the invention.

DETAILED DESCRIPTION OF ILLUSTRATIVE EMBODIMENT

As used herein a fabric is an independent switch group or router group, and a link is a connection between any two elements (end node or switch) and can be a bus or a pair of unidirectional connections.

Figure 1A:
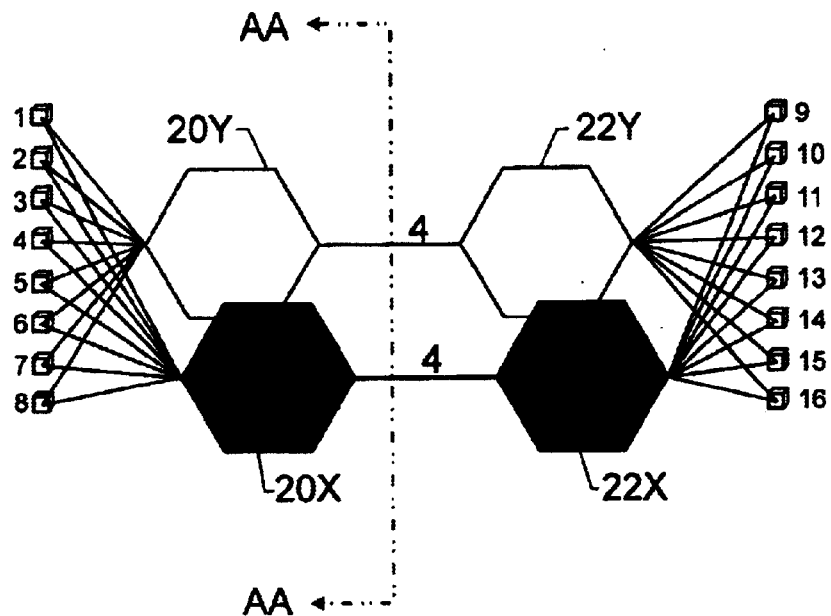
FIG. 1A illustrates a conventional switch network having 16 user nodes (X, Y) interconnected by two identical fabrics (X, Y) each including two 12-port switches (routers)

Referring now to the drawing, FIG. 1A is a functional block diagram of a conventional switch network for 16 user nodes (1–16) with each node having two ports (X, Y) with the X ports connected through two 12-port switches 20X, 22X and the Y ports interconnected through two 12-port switches 20Y, 22Y. As illustrated, the two (X, Y) fabrics are identical in the connection of the two 12-port switches with each other and with the 16 nodes connected to the switches. Since each of the 12-port switches has 8 users connected thereto, 4 ports are provided for interconnection between switches. In this embodiment 56 pairs of nodes can be interconnected at a distance 1 (i.e., through only one switch) while 64 node pairs are interconnected at a distance two (i.e., through two switches). For example, node 1 (X or Y) is interconnectable with nodes 2, 3, 4, 5, 6, 7, or 8 through either switch 20X or switch 20Y. Similarly, node 9 (X, Y) can be connected to any one of nodes 10, 11, 12, 13, 14, 15, and 16 through a single switch 22X, 22Y. Node 1 (X, Y) is connectable to any one of nodes 9 through 16 through two switches (20X, 22X or 20Y, 22Y). A bisection of the network along a weakest dimension as illustrated by line AA shows a bisection width of 8 links, 4 links connecting the two Y switches and 4 links connecting the two X switches.

Figure 1B:
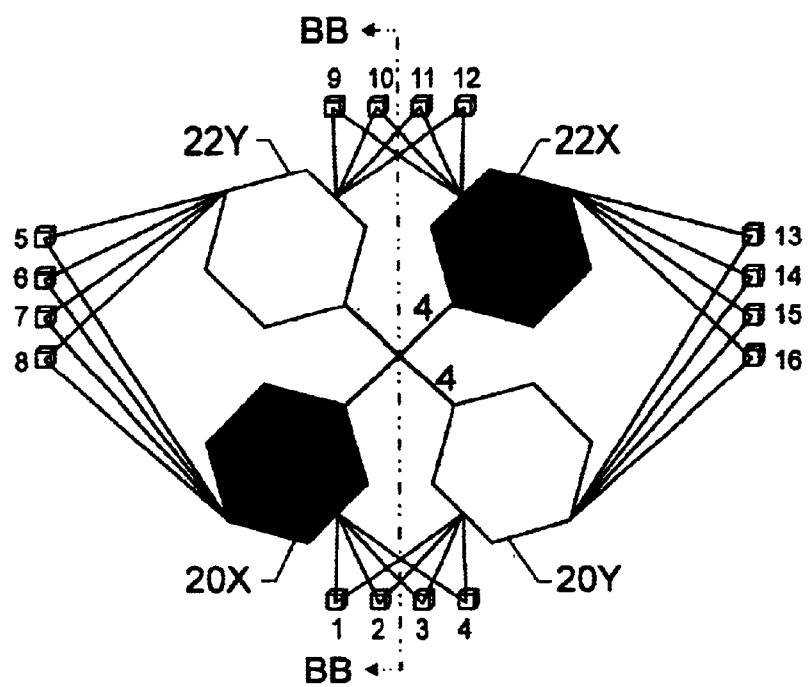
FIG. 1B illustrates a similar switch network but with asymmetric topologies of the node connections in accordance with one embodiment of the invention.

Consider now a reconnection of the 4 switches in an asymmetric topology as illustrated in FIG. 1B. In this embodiment the X nodes 1–8 are again connected to switch 20X and the X nodes 9–16 are again connected to switch 22X. However, Y nodes 1–4 along with Y nodes 13–16 are connected to switch 20Y, and Y nodes 5–12 are connected to switch 22Y. A bisection of this network along line BB shows a bisection width of 16 links, thus doubling the transmission capacity of the network vis-a-vis FIG. 1A. Further, 88 pairs of nodes are now interconnected through a single switch or distance 1 while 32 pairs of nodes are connected through two switches at a distance 2. Accordingly, the asymmetric topologies of the X fabric and the Y fabric produce a doubling of bisection width and more than fifty percent increase in the number of pairs of nodes which are connected at a distance 1.

Figure 2A:
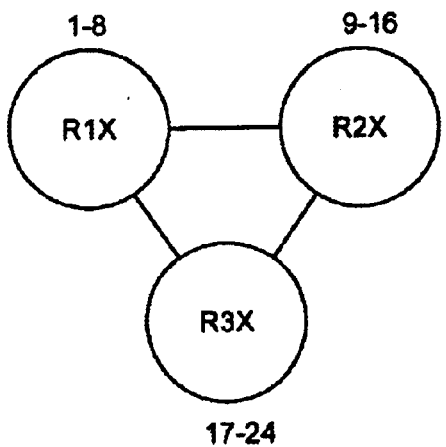
FIG. 2A and FIG. 2B illustrate a 24-node topology using 12-port switches in two (X,Y) asymmetric fabrics.
Figure 2A:
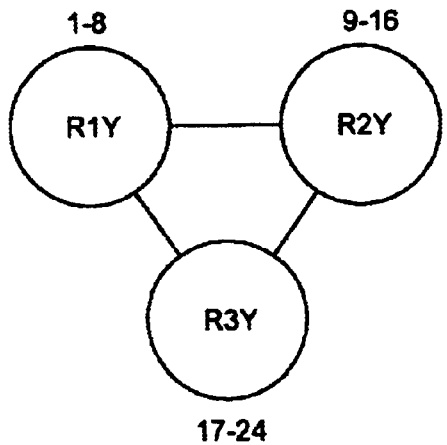
Figure 2B:
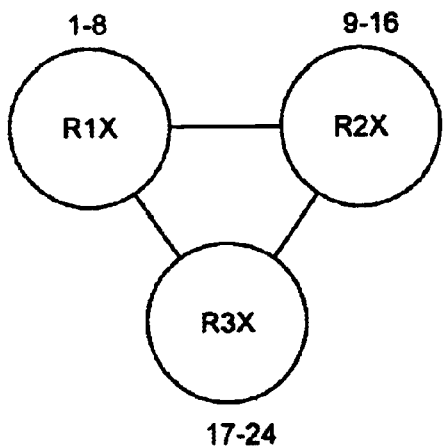
Figure 2B:
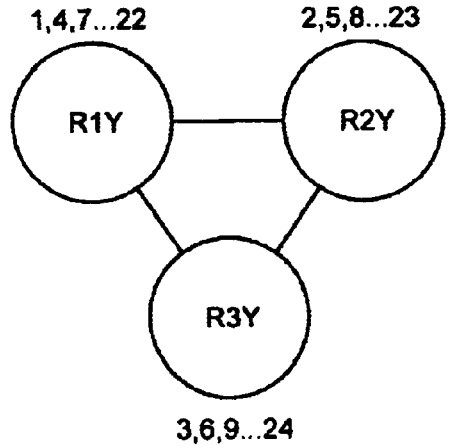

FIGS. 2A and 2B illustrate X and Y fabrics each comprising three 12-port switches in a 24-node topology, in accordance with the prior art and with the invention respectively. The X nodes N1–N8 are connected to switch R1X, X nodes N–N16 are connected to switch R2X, and X nodes N7–N24 are connected to switch R3X, each pair of X switches is interconnected by four links. Similarly, each pair of Y switches R1Y, R2Y and R3Y are interconnected by four links. However, Y nodes N1, N4, N7—N22 in FIG. 2B are connected to switch R1Y, Y nodes N2–N5, N8 . . . N23 are connected to Y switch R2Y, and Y nodes N3, N6, N9 . . . N24 are connected to Y switch R3Y.

If the X fabric were identical to the Y fabric as in FIG. 2A prior art, then the shortest path between certain pairs of nodes (e.g. N1 and N9) would be two hops (distance 2). Only 84 pairs of nodes would be distance 1 and 192 pairs of nodes would be distance 2 in connections. Graph bisection is 16 links.

However, the asymmetric fabrics of FIG. 2B has 147 pairs of nodes with distance 1 connections and only 129 pairs of nodes are distance 2 connected. Further, a graph bisection width is 24 links. Therefore, the use of asymmetric fabrics reduces the average inter-node distance and increases the number of links in the bisection.

Figure 3A:
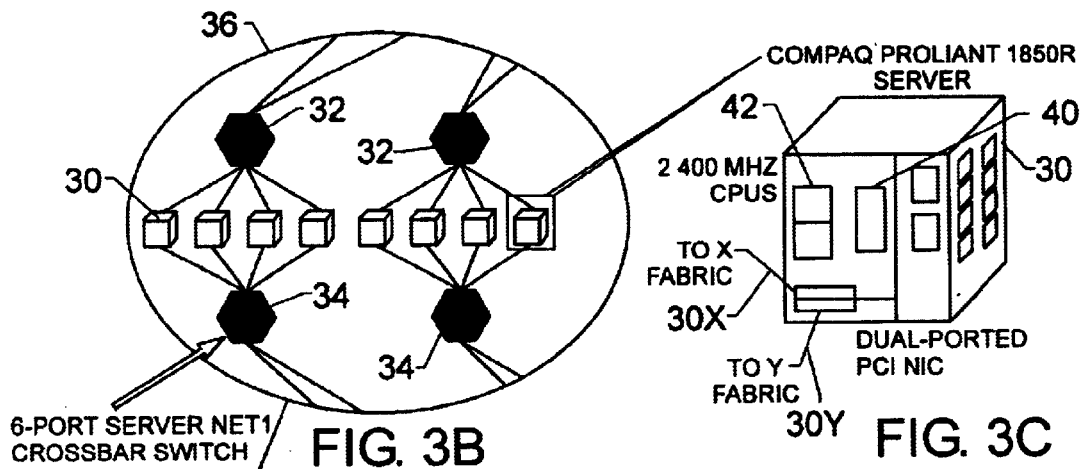
Figure 3A:
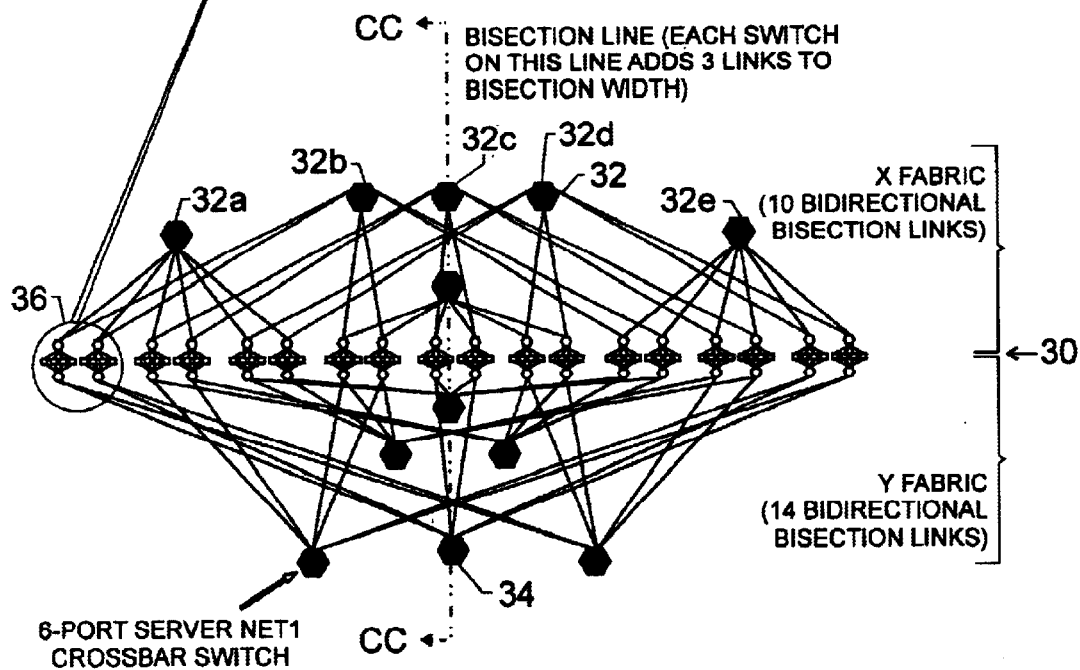

FIGS. 3A–3C illustrate a 72-node 48-switch topology in accordance with another embodiment of the invention. 72 nodes 30 as shown in FIGS. 3A, 3B, and 3C are interconnected by an X fabric including 24 switches 32 and by a Y fabric having 24 crossbar switches 34. As shown in FIG. 3C, each node has an X fabric port 30X and a Y fabric port 30Y which are connected through an internal PCI bus 40 to two 40 MHz CPUs 42. In this embodiment each switch or router is a 6-port ServerNet-I crossbar switch available from Tandem Computers Division of Compaq Computer Corporation. Each unit 36 includes two groups of nodes 30 as shown in FIG. 3B.

Each group of nodes connects to the X fabric, and to the Y fabric, through two different routers. For example, each user group in unit 36 is connected to router 32 and to router 34. Thus failure of one router in a fabric does not disrupt connection between any two nodes.

The weakest bisection C—C of the asymmetric fabric topology has 24 links (3 for each bisected switch "32 or 34", plus each bisected line). The X and Y fabrics, when considered independently, have only 10 links in each of their bisections. Thus, if Y fabric were constructed identical to the X fabric, the net width of the weakest bisection would have been just 20 links. While each X, Y fabric has the same number of switches or routers, the interconnection of the various nodes to the switches differs in the X fabric as compared to the Y fabric, thus altering the shortest distance between nodes. Numbering the units in FIG. 3A from 1 to 9 (left to right), it can be seen that there is exactly one-hop path (either in the X fabric or in the Y fabric but not in both) between a group of nodes in one unit and an group of nodes in a different unit. for groups of nodes within the same unit, there are two one-hop paths in the X fabric and two in the Y fabric. The following matrix shows the routers (and the fabrics) providing one-hop paths between groups of nodes in various units.

|    | U1 | U2 | U3 | U4 | U5 | U6 | U7 | U8 | U9 |
|----|----|----|----|----|----|----|----|----|----|
| U1 | 32a(X) 32b(X) 34f(Y) 32e(Y) | 32a(X) | 32a(X) | 32b(X) | 34e(Y) | 34f(Y) | 32b(X) | 34f(Y) | 34e(Y) |
| U2 | 32a(X) | 32a(X) 32c(X) 34c(Y) 34d(Y) | 32a(X) | 32d(Y) | 32c(X) | 34c(Y) | 34c(Y) | 32c(X) | 34d(Y) |
| U3 | 32a(X) | 32a(X) | 32a(X) 32d(X) 34a(Y) 34b(Y) | 34b(Y) | 34a(Y) | 32a(X) | 34a(Y) | 34b(Y) | 32a(X) |
| U4 | 32b(X) | 34d(Y) | 34b(Y) | 32b(X) 32f(X) | 32f(X) | 32f(X) | 32b(X) | 34b(Y) | 34d(Y) |

-continued

|    | U1     | U2     | U3     | U4                              | U5                                      | U6                              | U7                              | U8                                      | U9                                      |
|----|--------|--------|--------|---------------------------------|-----------------------------------------|---------------------------------|---------------------------------|-----------------------------------------|-----------------------------------------|
|    |        |        |        | 34b(Y) 34d(Y)                   |                                         |                                 |                                 |                                         |                                         |
| U5 | 34e(Y) | 32c(X) | 34a(Y) | 32f(X)                          | 32c(X) 32f(X) 34a(Y) 34e(Y)             | 32f(X)                          | 34a(Y)                          | 32c(X)                                  | 34e(Y)                                  |
| U6 | 34f(Y) | 34c(Y) | 32d(X) | 32f(X)                          | 32f(X)                                  | 32d(X) 32f(X) 34c(Y) 34f(Y)     | 34c(Y)                          | 34f(Y)                                  | 32d(X)                                  |
| U7 | 32b(X) | 34c(Y) | 34a(Y) | 32b(X)                          | 34a(Y)                                  | 34c(Y)                          | 32b(X) 32e(X) 34a(Y) 34c(Y)     | 32e(X)                                  | 32e(X)                                  |
| U8 | 34f(Y) | 32c(X) | 34b(Y) | 34b(Y)                          | 32c(X)                                  | 34f(Y)                          | 32e(X)                          | 32c(X) 32e(X) 34b(Y) 34f(Y)             | 32e(X)                                  |
| U9 | 34e(Y) | 34d(Y) | 32d(X) | 34d(Y)                          | 34e(Y)                                  | 32d(X)                          | 32e(X)                          | 32e(X)                                  | 32d(X) 32e(X) 34d(Y) 34e(Y)             |

Figure 4A:
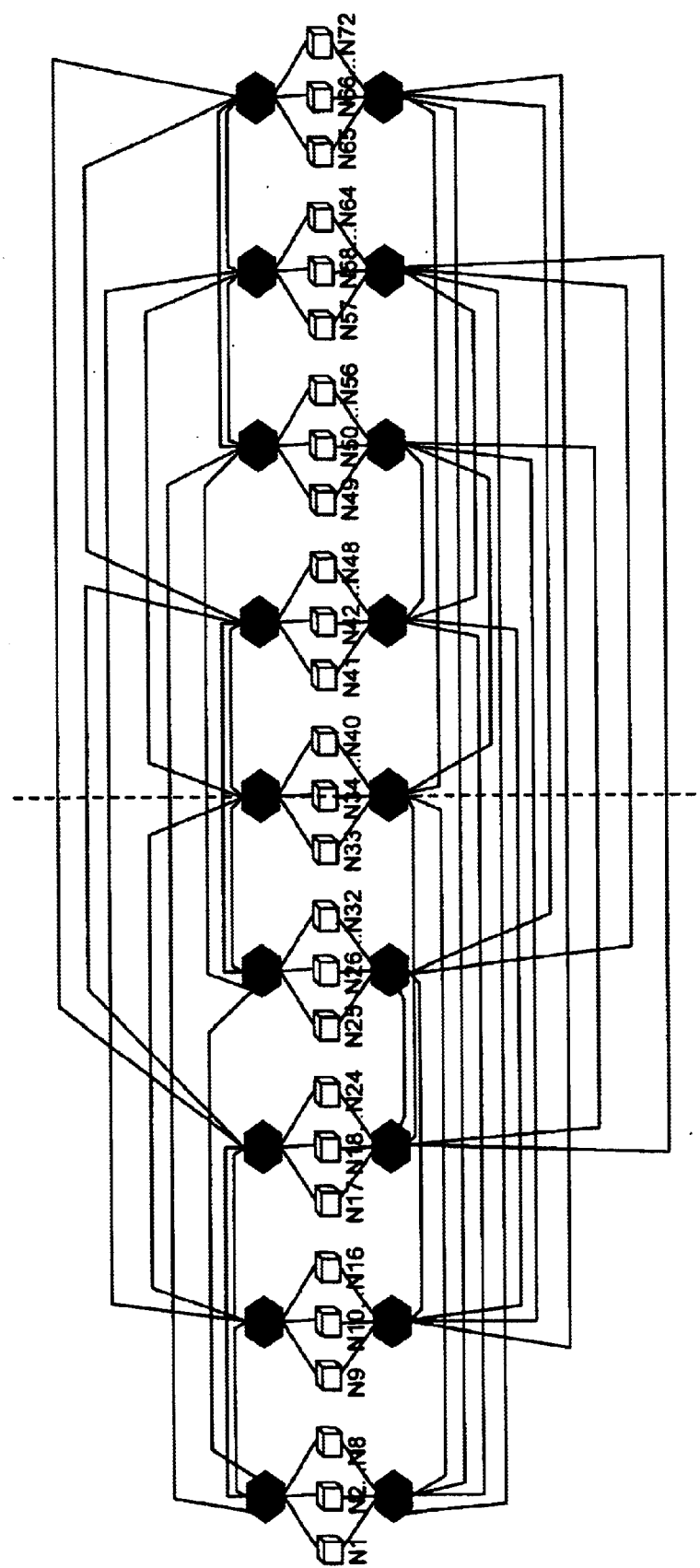
FIG. 4A illustrates another 72-node asymmetric topology using 18 12-port switches in asymmetric X and Y fabrics in accordance with the invention.
Figure 4B:
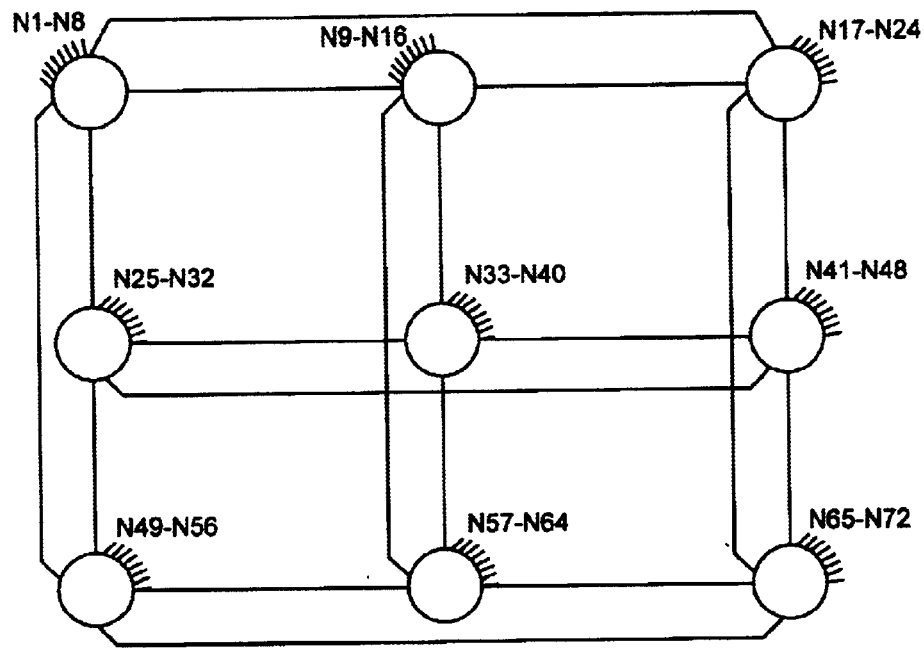
FIGS. 4B, 4C are equivalent schematics of the X fabric and Y fabric, respectively.
Figure 4C:
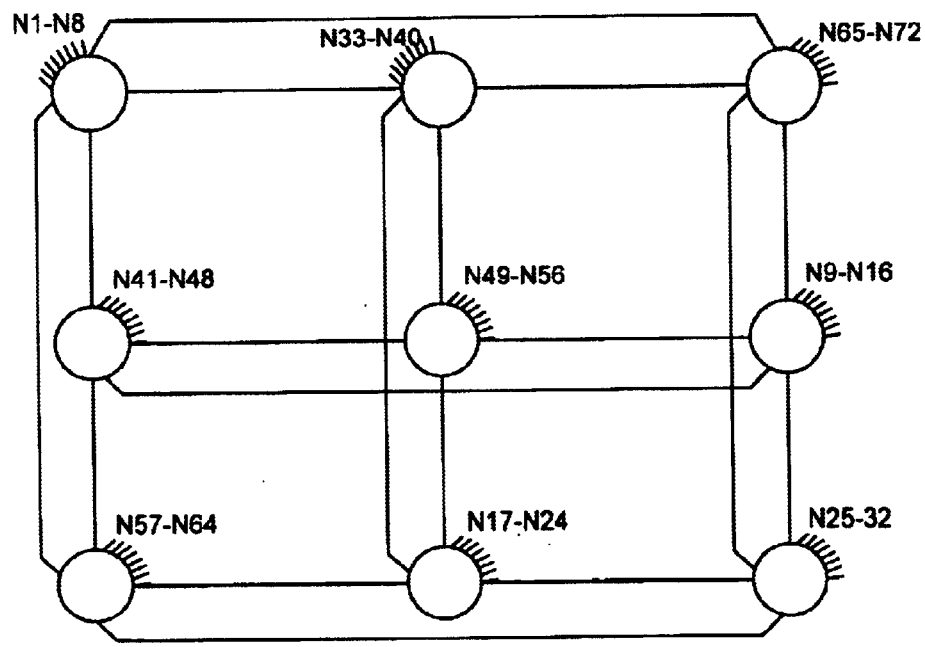

FIGS. 4A, 4B, and 4C illustrate a 72-node asymmetric topology (FIG. 4A) using 12-port routers or switches and equivalent circuits for the X fabric (FIG. 4B) and the Y fabric (FIG. 4C), respectively. Every group of 8 nodes is connected, via a maximum of 2 hops, to every other group of 8 nodes in either the X fabric or the Y fabric. There are 9 groups of 8 nodes each, or a total of 72 nodes.

The topology provides a way to connect 72 nodes using nine 12-port switches so that the maximum distance between any pair of nodes is only two router (switch) hops when using the preferred fabric. The matrix below shows the preferred fabric for every pair. With asymmetric X and Y fabrics as shown the weakest bisection has 28 links using 18 routers. If identical fabrics were used, the weakest bisection would have 24 links and the maximum distance between any pair of nodes would be 3 hops. Accordingly, the asymmetric topology again reduces distance and increases bisection width.

|         | N1–N8 | N9–N16 | N17–N24 | N25–N32 | N33–N40 | N41–N48 | N49–N56 | N57–N64 | N65–N72 |
|---------|-------|--------|---------|---------|---------|---------|---------|---------|---------|
| N1–N8   | X/Y   | X      | X       | X       | Y       | Y       | X       | Y       | Y       |
| N9–N16  | X     | X/Y    | X       | Y       | X       | Y       | Y       | X       | Y       |
| N17–N24 | X     | X      | X/Y     | Y       | Y       | X       | Y       | Y       | X       |
| N25–N32 | X     | Y      | Y       | X/Y     | X       | X       | X       | Y       | Y       |
| N33–N40 | Y     | X      | T       | X       | X/Y     | X       | Y       | X       | Y       |
| N41–N48 | Y     | Y      | X       | X       | X       | X/Y     | Y       | Y       | X       |
| N49–N56 | X     | Y      | Y       | X       | Y       | Y       | X/Y     | X       | X       |
| N57–N64 | Y     | X      | Y       | Y       | X       | Y       | X       | X/Y     | X       |
| N65–N72 | Y     | Y      | X       | Y       | Y       | X       | X       | X       | X/Y     |

In the described embodiment, enhanced network performance has been realized through the addition of a second fabric differing in connectivity by at least one link from the first fabric, such that either the maximum distance between at least one pair of nodes is reduced or the net bisection width of the interconnection network is more than doubled after the second fabric is added. Similar improvements in network performance can be realized effectively by reducing the number of switches between switch groups or fabrics.

While the invention has been described with reference to specific embodiments, the description is illustrative of the invention and is not to be construed as limiting the invention. For example, the invention encompasses switch networks having more than 2 fabrics or switch groups. Also, the invention is described in the context of System Area Networks, but the invention applies equally well to other networks such as Fibre channel, ATM, and switched Ethernet. Thus, various modifications and applications may occur to those skilled in the art without departing from the true spirit and scope of the invention as defined by the appended claims.

What is claimed is:

1. A method of structuring a multi-fabric network for interconnecting multi-port user nodes to enhance network performance, comprising:

providing a first fabric having a first plurality of multi-port devices configured as multi-port crossbar switches or routers interconnected with a first plurality of user node ports whereby said first plurality of user node ports are interconnected through one or more of the first plurality of devices; and providing a second fabric having a second plurality of multi-port devices configured as multi-port crossbar switches or routers interconnected with a second plurality of user node ports whereby said second plurality of ports are interconnected through one or more of the second plurality of devices, the first fabric and the second fabric being asymmetrical with at least one path between a pair of user nodes in the first and second fabrics, respectively, being different in distance, thereby causing one or both of increased bisection bandwidth, and reduced internode distances.

2. The method as defined in claim 1 wherein the first fabric is an X fabric and the second fabric is a Y fabric, or vice versa, the X and Y fabrics being provided for two-port user nodes (X,Y) with the X ports of all user nodes connected to the X fabric and the Y ports of all user nodes connected to the Y fabric.

3. The method as defined in claim 2 wherein all of said plurality of X ports are interconnected only through the X fabric, and all of said plurality of Y ports are interconnected only through the Y fabric.

4. The method as defined claim 1 wherein the first fabric can interconnect all user nodes when a fault occurs in the second fabric, and vice versa.

5. The method as defined in claim 1 wherein a message from a user node port can be divided into at least two parts with the parts being transmitted through different fabrics.

6. The method as defined in claim 4 wherein at least one distance 1 connection between a pair of user nodes in the X fabric is not a distance 1 connection in the Y fabric.

7. The method as defined in claim 1 wherein the first fabric has a different number of switches than has the second fabric.

8. The method as defined in claim 1 wherein, if multi-port devices configured as cross bar switches or routers are provided between the first and second fabrics, the method further comprises reducing the number of such inter-fabric devices.

9. The method as defined in claim 2 wherein the X fabric has a different number of switches than has the Y fabric.

10. The method as defined in claim 1 wherein the first and second fabrics differ in connectivity by at least one link such that either the maximum distance between at least one pair of nodes is reduced or the bisection bandwidth of the network is increased.

11. The method as defined in claim 1 further comprising:
interconnecting a pairs of user nodes through the shortest corresponding path in the first and second fabrics.

12. The method as defined in claim 1 wherein at least one distance 1 connection between a pair of user nodes in one fabric is not a distance 1 connection in another fabric.

13. The method as defined in claim 1 wherein one fabric has a different number of switches than another fabric.

14. A multi-fabric network with asymmetric fabrics for interconnecting multi-port user nodes, comprising:
a first fabric having a first plurality of multi-port devices configured as switches or routers interconnected with a first plurality of user node ports whereby said first plurality of user node ports are interconnected through one or more of the first plurality of multi-port devices; and
a second fabric having a second plurality of multi-port devices configured as switches or routers interconnected with a second plurality of user node ports whereby said second plurality of user node ports are interconnected through one or more of the second plurality of multi-port devices, the first fabric and the second fabric being asymmetrical with at least one path in the first and second fabrics, respectively, between a pair of user nodes being different in length thereby causing one or both of increased bisection bandwidths, and reduced internode distances.

15. The network as defined in claim 14 wherein the first fabric is an X fabric and the second fabric is a Y fabric, or vice versa, and wherein the X and Y fabrics being provided for 2-port users (X, Y) with X ports connected to the X fabric and Y ports connected to the Y fabric.

16. The network as defined in claim 14 wherein the first fabric can interconnect all user node ports when a fault occurs in the second fabric, and vice versa.

17. The network as defined claim 14 wherein a message from a user node port can be divided into at least two parts with the parts being transmitted through different fabrics.

18. The network as defined in claim in 14 wherein each fabric comprises two 12-port devices for interconnecting 16 user nodes, a first 12-port device in one of the fabrics being connected to nodes 1–8 and the second 12-port device in that fabric being connected to nodes 9–16, a first 12-port device in another one of the fabrics being connected to nodes 5–12 and a second 12-port device in that fabric being connected to nodes 1–4 and 13–16, the first and second 12-port devices in each fabric being connected by 4 links.

19. The network as defined in claim 14 wherein any pair of nodes is connected by at least two different multi-port device paths whereby failure of one multi-port device in a fabric does not cause fabric failure.

20. The network as defined in claim 19 wherein each pair nodes has a preferred path with distance n and another path with distance -n.

21. The network as defined in claim 14 wherein user nodes are grouped into a plurality of clusters in each of which the user nodes, each cluster including an X fabric multi-port device and a Y fabric multi-port device, each cluster being directly coupled to two multi-port devices to provide at least two paths to other clusters, whereby failure of one multi-port device in a fabric will not cause fabric failure.

22. A method of structuring a network for interconnecting multi-port user nodes, comprising:
providing a first switch group having a first plurality of multi-port devices configured as cross bar switches or routers interconnected with a first plurality of user node ports whereby said first plurality of user node ports are interconnected through one or more of the first plurality of devices; and
providing a second switch group having a second plurality of multi-port devices configured as cross bar switches or routers interconnected with a second plurality of user node ports wherein said second plurality of user node ports are interconnected through one or more of the second plurality of devices, the first switch group and the second switch group being asymmetrical with at least one path in the first and second switch groups being different in length thereby causing one or both of increased bisection bandwidth, and reduced internode distances.

23. The method as defined by claim 22 wherein two switch groups (X,Y) are provided for two-port user nodes (X,Y) with the X ports of all user nodes connected to the X group and the Y ports of all user nodes connected to the Y group.

24. The method as defined in claim 23 wherein all of said plurality of X ports are interconnected only through the X switch group, and all of said plurality of Y ports are interconnected only through the Y switch group.

25. The method as defined by claim 22 wherein one switch group can interconnect all nodes when a fault occurs in the other switch group.

26. The method as defined by claim 22 wherein a message from one user node port can be divided into at least two parts with the parts being transmitted through different switch groups.

27. The method as defined by claim 23 wherein at least one distance 1 connection between a pair of user nodes in the X switch group is not a distance 1 connection in the Y switch group.

28. The method as defined by claim 23 wherein the X switch group has a different number of multi-port devices than has the Y switch group.

29. The method as defined by claim 22 and further comprising:

interconnecting two nodes through the shortest path in the first switch group and the second switch group.

30. A network with asymmetric fabrics for interconnecting multi-port user nodes, comprising:

a first switch group having a first plurality of multi-port devices configured as switches or routers interconnected with a first plurality of user node ports whereby said first plurality of user node ports are interconnected through one or more of the first plurality of devices; and a second switch group having a second plurality of multi-port devices configured as switches or routers interconnected with a second plurality of user node ports whereby said second plurality of user node ports are interconnected through one or more of the second plurality of devices, the first group and the second group being asymmetrical with at least one path path in the first and second fabrics, respectively, between a pair of user nodes being different in length, thereby causing one or both of increased bisection bandwidth, and reduced internode distances.

31. The network as defined by claim 30 wherein two groups (X,Y) are provided for 2-port user nodes (X,Y) with X ports connected to the X switch group and Y ports connected to the Y switch group.

32. The network as defined by claim 31 wherein all of said plurality of X ports are interconnected only through the X switch group and all of the plurality of Y ports are interconnected only through the Y switch group.

33. The network as defined by claim 31 wherein all of said plurality of X ports are interconnected through the X switch group and the Y switch group, and all of the plurality of Y ports are interconnected through the X switch group and the Y switch group.

34. The network as defined by claim 31 wherein a message from one user node port can be divided into at least two parts with the parts being transmitted through different switch groups.

35. The switch network as defined by claim 31 wherein each group comprises two 12port devices configured as switches or routers for interconnecting 16 user nodes, a first device in a first switch group being connected to user nodes 1–8 and the second device in the first switch group being connected to user nodes 9–16, a first device in the second switch group being connected to user nodes 5–12 and a second device in the second switch group being connected to user nodes 1–4 and 13–16, the first and second devices in each switch group being connected by 4 links.

36. The network as defined by claim 30 wherein any pair of user nodes is connected by at least two different paths whereby failure of one multi-port device in a switch group does not cause switch group failure.

37. The network as defined by claim 36 wherein each pair of user nodes has a preferred path with distance 1.

38. A network topology with asymmetric fabrics for interconnecting node ports, comprising:

a first fabric having a first plurality of devices configured as switches or routers for interconnecting the node ports; and a second fabric having a second plurality of devices configured as switches or routers for interconnecting the node ports, the second fabric being asymmetrical to the first fabric by having a distance -n in the first fabric between nodes in the first fabric that is not a distance -n in the second fabric between these nodes, thereby causing one or both of increased bisection bandwidth and-, reduced internode distances.

39. The network of claim 38 further comprising one or more devices configured as a switch or router for interconnecting between the first and second fabrics.

\* \* \* \* \*